Nov. 25, 1952  E. PICK ET AL  2,619,261
VOLUMETRIC FEEDER

Filed July 21, 1947  3 Sheets-Sheet 1

ERIC PICK,
GUSTAV R. CARLSSON
*INVENTORS*

BY

ERIC PICK,
GUSTAV R. CARLSSON
INVENTORS

Nov. 25, 1952     E. PICK ET AL     2,619,261
VOLUMETRIC FEEDER
Filed July 21, 1947     3 Sheets-Sheet 3
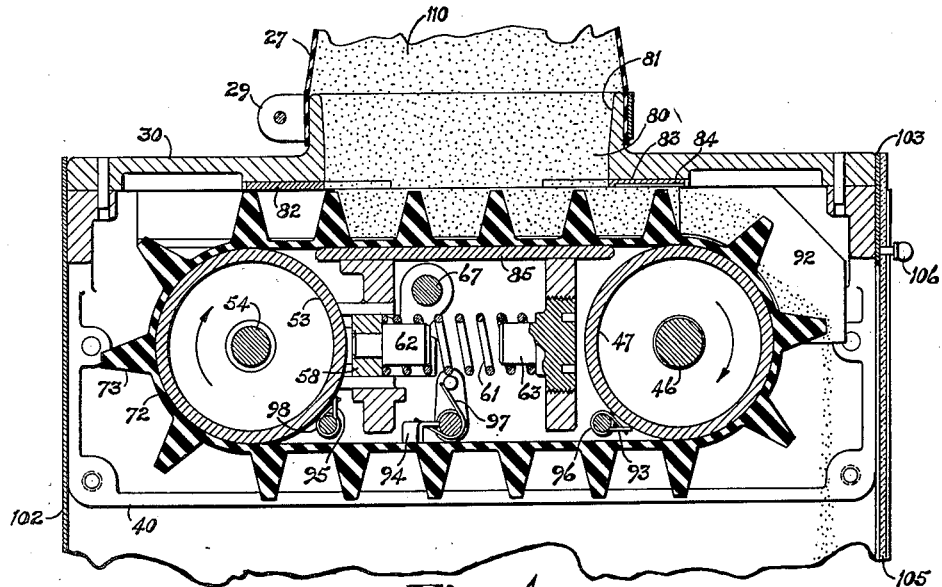
Fig. 4
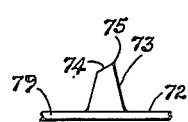
Fig. 7
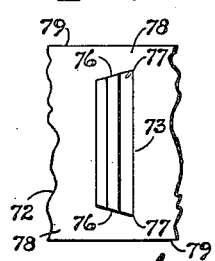
Fig. 6
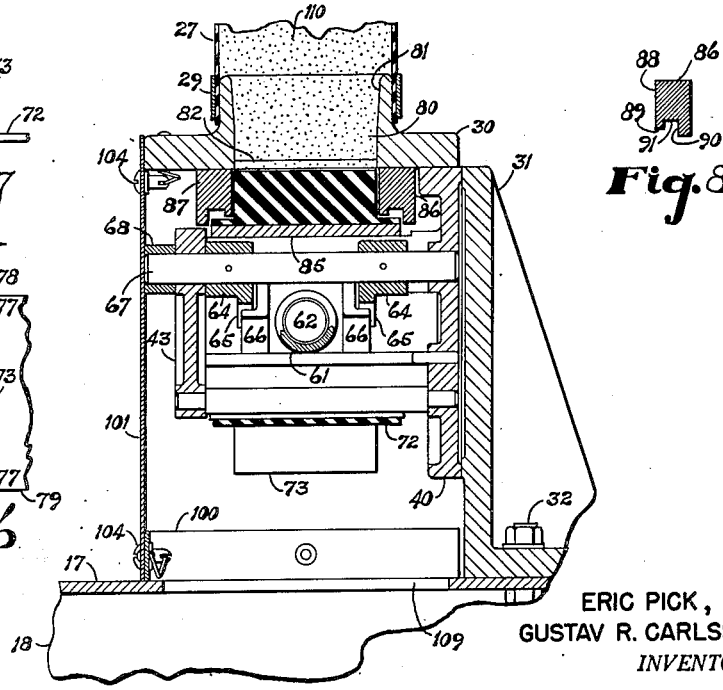
Fig. 8
Fig. 5
ERIC PICK,
GUSTAV R. CARLSSON
*INVENTORS*
BY Patented Nov. 25, 1952

2,619,261

UNITED STATES PATENT OFFICE 2,619,261

VOLUMETRIC FEEDER

Eric Pick, East Rockaway, N. Y., and Gustav R. Carlsson, Cliffside Park, N. J., assignors to The Permutit Company, New York, N. Y., a corporation of Delaware Application July 21, 1947, Serial No. 762,396

4 Claims. (Cl. 222—371)

This invention relates to volumetric feeders; and it comprises apparatus for measuring and dispensing fluent materials volumetrically, comprising a hopper having a vertical axis and adapted to contain a quantity of such materials, a drive pulley and an idler pulley rotatably mounted in a horizontal plane below said hopper and on opposite sides of said axis, power means for rotating said drive pulley, an endless belt passing over said pulleys and having its upper branch facing said hopper, a plurality of transverse partitions on the outward side of said belt, top and side guides for said partitions forming a passageway extending along said upper branch, and an aperture in said passageway in communication with said hopper; all as more fully hereinafter set forth and as claimed.

In many chemical operations it is necessary to feed solid materials in the form of powder or small granules at some definite rate or in some definite proportion to a flow of fluid. For example, in water treatment it is necessary to feed softening agents, coagulating agents or other materials to a flow of water in predetermined proportions. Many types of apparatus have been devised for this purpose. Feeding powdered or granular solids volumetrically and accurately presents difficulties. Solids will flow somewhat like liquids if they are in the form of small particles, especially if they are agitated or vibrated. On the other hand, there is also a tendency for such materials to arch or cling in the feed hopper.

The objects of this invention are to provide apparatus for accurately displacing materials volumetrically, and to provide such apparatus which is efficient in performance, reliable in operation, and relatively simple in construction.

The manner in which these objects are achieved is shown in the appended drawings in which:

Fig. 4 is a view, partly in section along lines 4—4 of Fig. 3;

Fig. 5 is a view, partly in section along lines 5—5 of Fig. 2;

Figs. 6 and 7 are a plan view and an elevation, respectively, of a portion of a modified belt suitable for use in our apparatus; and Fig. 8 is a view, in section, of the side guide 86 of Fig. 5.

Like numerals refer to like parts throughout the several views.

Figure 1:
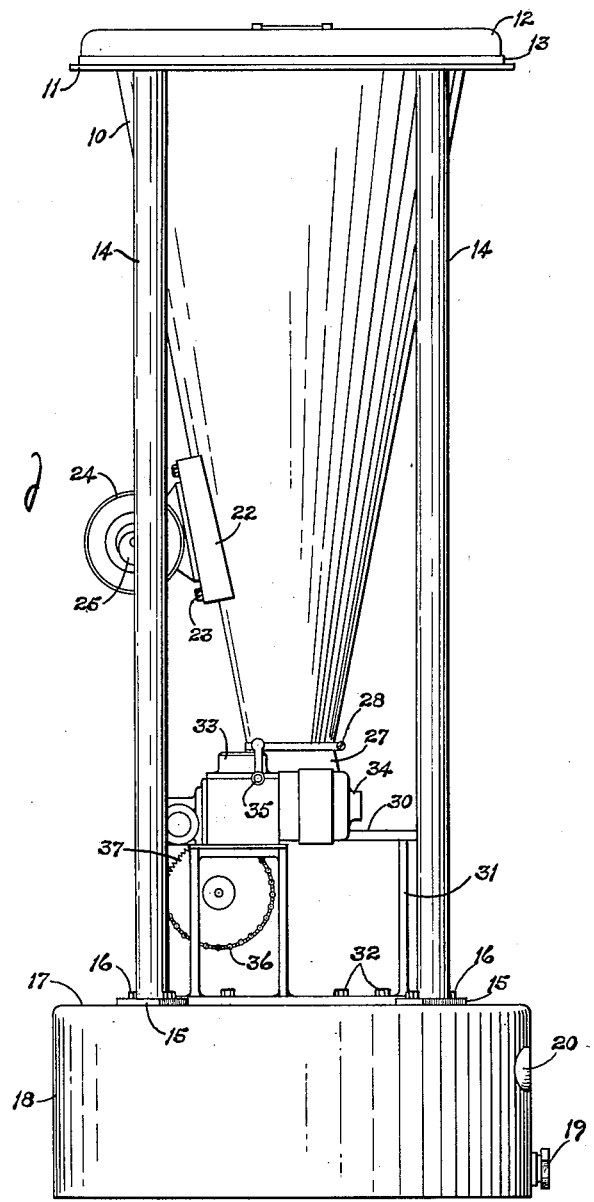
Fig. 1 is an elevation of an apparatus in accordance with our invention.
Figure 3:
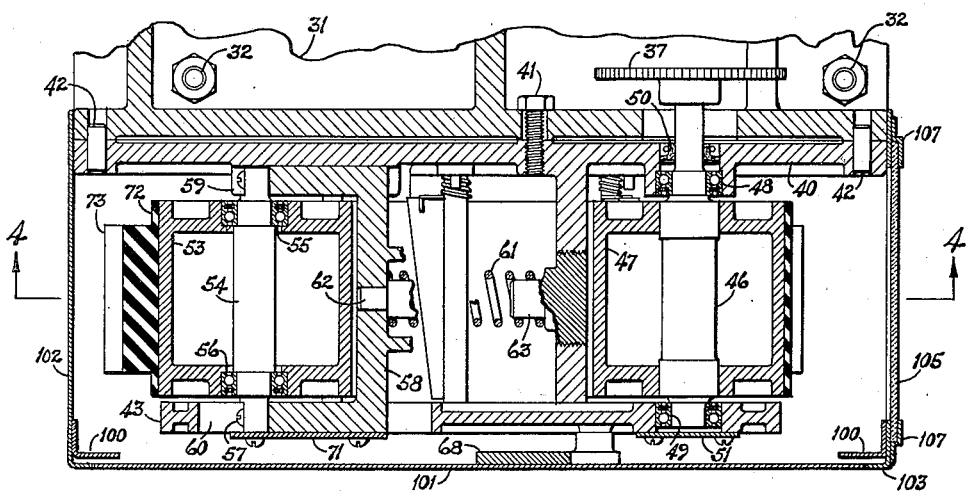
Fig. 3 is a view, partly in section along lines 3—3 of Fig. 2.

In the drawings, Fig. 1 shows the complete apparatus. A feed hopper 10 is supported from a flange 11. While the details of such support are not shown, it is advantageous to mount the hopper on rubber shock absorbers so as to prevent vibration of the hopper from becoming transmitted to the remainder of the apparatus. The top of the hopper 10 is closed by a cover 12, advantageously provided with a rubber channel 13 resting on the flange 11. Four pipe supports 14 are welded to the flange 11 and carry at their lower ends flanges 15, which by means of screws 16, are fastened to the top 17 of a mixing tank 18. The mixing tank 18 is provided with a water inlet 19 and with an outlet 20 through which the material being fed is conducted to a point of use in the form of a solution or slurry, as the case may be. To the side of the hopper 10 a bracket 22 is fastened by means of screws 23, and on the bracket 22 is mounted a motor 24 driving an eccentric 25.

Figure 2:
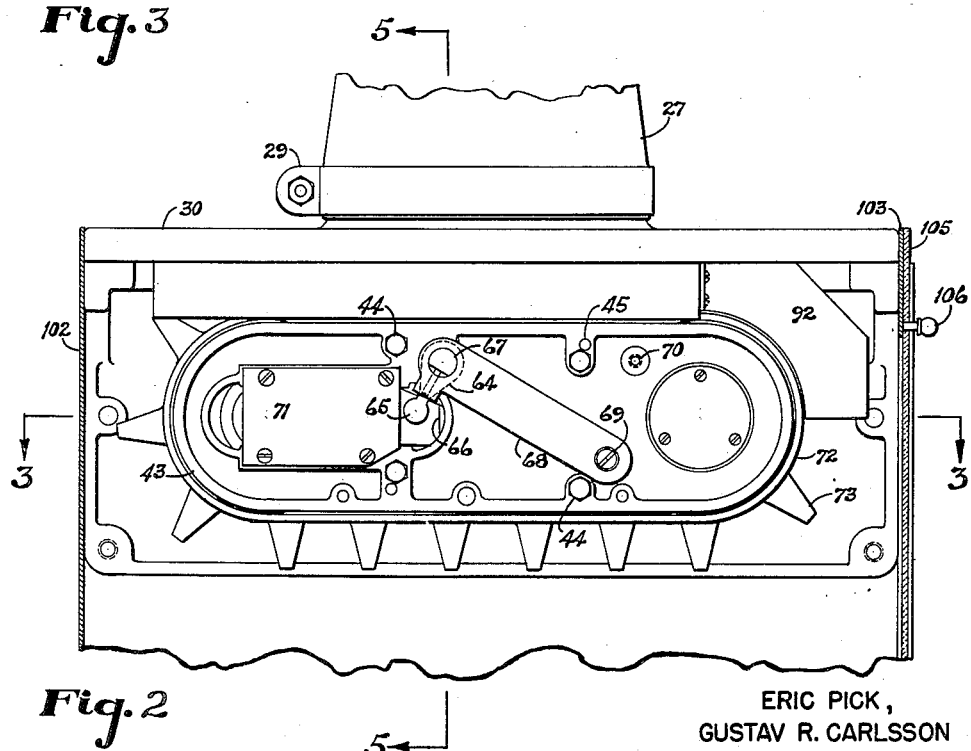
Fig. 2 is an elevation on a larger scale of the feeding mechanism of the apparatus of Fig. 1, with the cover partly cut away.

A rubber sleeve 27 is fastened by means of a screw clamp 28 to the lower end of the hopper 10 and by means of a screw clamp 29 (Fig. 2) to the top plate 30 of the feeding mechanism. A bracket 31 supporting the feeding mechanism is attached to the top 17 of the mixing tank 18 by means of screws 32. To drive the feeding mechanism a variable speed reducer 33 is provided of the type shown and described in Jones Patent 2,405,957, dated August 20, 1946, which is driven by a motor 34 and the output speed of which may be adjusted by turning a crank 35 which varies the speed of a chain 36 driving a sprocket 37.

Referring now to Figs. 2-8, the mechanism has a support plate 40 secured to the bracket 31 by means of screws 41 and dowel pins 42. An opposed plate 43 is secured to the support plate 40 in spaced relationship by means of screws 44 and dowel pins 45. A drive shaft 46 carrying the sprocket 37 has mounted thereon a drive pulley 47. The drive shaft 46 runs in ball bearings 48 and 49 provided with integral felt seals and mounted in the support plate 40 and the opposed plate 43, respectively, the entry of dust into the ball bearings from the outside being prevented by a felt seal 50 on the side facing the sprocket 37 and by a cover plate 51 on the other side.

An idler pulley 53 is rotatably mounted on a shaft 54 by means of ball bearings 55 and 56 provided with integral felt seals. The shaft 54 is secured by means of screws 57 to an idler bracket 58 which is slideably mounted in a slot 59 in the support plate 40 and a slot 60 in the opposed plate 43. An idler spring 61, centered on a stud 62 pressed into the idler bracket 58 and on a stud 63 screwed into the support plate 40, urges the idler bracket 58 away from the drive pulley 47.

To release the spring tension, if desired, there are provided two hubs 64 with fingers 65 adapted to engage projections 66 on the idler bracket 58 on rotation of shaft 67 by means of the lever 68. The lever 68 is normally secured in the position shown in Fig. 2 by means of a screw 69, another location for such screw being provided at 70. The idler bracket 58 is prevented from sidewise shifting by a plate 71.

A belt 72 is mounted on the drive pulley 47 and the idler pulley 53. This belt carries thereon partitions 73 equally spaced from each other and of lesser width than the belt so as to provide on either side of the partitions strips 78 of belt free of partitions. The partitions 73 advantageously take the form shown in Figs. 6 and 7, the tops 74 of the partitions sloping away from the leading top edges 75 and the sides 76 of the partitions 73 being so made as to result in a decrease in the width of the partition 73, away from the leading side edges 77.

In the top plate 30 which is mounted on the support plate 40 there is provided an opening 80 surrounded by a lip 81 to which the rubber sleeve 27 is fastened by means of the screw clamp 29. Attached to the top plate 30 is a rear top guide 82 and a front top guide 83, the latter being relieved at 84 over the major portion of its length beginning at the end nearest to the drive pulley 47. On the support plate 40 is mounted a supporting shoe 85 to support the upper branch of the belt 72 directly below the opening 80 and thus carry the weight of material in the hopper. On either side of the partitions 73 are mounted side guides 86 and 87, each of which, as shown in Fig. 8, has a guide surface 88 for the sides 76 of the partitions, a narrow guide surface 89 for the strips 78 of the belt 72 next to the partitions, and a guide surface 90 for the edge 79 of the belt, there being a relieved portion 91. There are also provided segmental side guides 92 next to the partitions 73 passing over the drive pulley 47.

Angularly disposed scrapers 93, 94 and 95 are forced by the respective springs 96, 97 and 98 against the drive pulley 47, the inside of the lower branch of the belt 72 and the idler pulley 53, respectively.

A framework 100 is secured to the top 17 of the mixing tank 18 and to the feeding mechanism. This framework 100 supports a side cover 101, a rear cover 102 and a front cover 103 which form an enclosure for the feeding mechanism open at the bottom into the top 17 of the mixing tank 18 through an opening 109. The covers, especially the side cover 101, are advantageously secured in place by conventional spring fasteners 104 which permit quick and easy removal for inspection or servicing. On the front cover 103 is an inspection door 105 provided with a knob 106 and slideable in tracks 107. This inspection door is advantageously made of transparent material, such as a transparent plastic, to permit observation of the feeding mechanism during operation.

In operation of our apparatus the hopper 10 is filled with powdered or granular material 110 which is to be fed. The motor 24 is placed in operation thus rotating the eccentric 25 and imparting vibration to the hopper 10 which keeps the material 110 moving. The motor 34 is likewise placed in operation and the crank 35 is turned to a position corresponding to the desired rate of rotation of sprocket 37 and drive pulley 47. As the belt 72 moves, its upper branch sliding over the supporting shoe 85 passes under the opening 80 so that the material 110 falls through the opening 80 into and fills the spaces between the partitions 73 and the side guides 86 and 87. As the partitions 73 move through the passageway formed by the side guides 86 and 87 and the top guides 82 and 83 they carry the material 110 towards the drive pulley 47. When the belt passes over the drive pulley 47 the material 110 drops out, as shown in Fig. 4, and falls through the opening 109 into the mixing tank 18. Because of the bending and resulting distortion of the belt 72 around the drive pulley 47 any clinging of material to the belt is prevented, resulting in an accurate volumetric discharge of the material 110 into the mixing tank 18.

As the pulleys 47 and 53 rotate and as the belt moves, the angularly disposed scrapers 93, 94 and 95 remove any material which may have reached the surfaces upon which the scrapers rest and these surfaces are thus effectively kept clear of the material being fed. Any material removed by the scrapers drops through the opening 109 into the mixing tank 18.

A continuous stream of water admitted into the mixing tank through the inlet 19 enters in the form of a jet and thus keeps the contents of tank 18 agitated. When soluble materials are being fed they dissolve; when insoluble materials are being fed a suspension or slurry is being formed. The solution or slurry, as the case may be, is discharged through the outlet 20 whence it flows by gravity or by pumping to the point of application.

When feeding of materials at a constant rate is desired the apparatus is allowed to operate in this manner, the desired rate of feed being adjusted by turning the crank 35. When, however, water is being treated at a varying rate of flow the feed of material can be proportioned to such varying rate of flow. This may, for instance, be done by operating the feeding mechanism for a predetermined period of time whenever a given volume of water undergoing treatment has passed through a water meter. A control device suitable for such arrangement is disclosed in U. S. Patent 2,204,097 of J. M. Montgomery, dated June 11, 1940.

An important feature of our invention is the arrangement of the top guides 82 and 83 which are equal in length to the spacing of any two adjacent partitions 73. In this manner, at least one of the partitions 73 always has its top 74 beneath each of the top guides, thus forming a lock which prevents the free flow of material from the hopper. On the other hand, it is undesirable to make the top guides appreciably longer than the spacing of the partitions because then they introduce additional friction.

When granular materials are being fed it is important to avoid parallel surfaces, one of which moves past the other, as this would allow grains to enter between such surfaces where they would cause an added load on the drive mechanism and greater wear. For this reason the relief 84 is provided in the frontal top guide 83, a similar relief is provided at 91 in the side guides 86 and 87 (see Fig. 8), and the partitions 73 decrease in height from their leading top edges and in width from their leading side edges (see Figs. 6 and 7). With this arrangement any material lodged between the sides of the partitions 73 and the side guides 86 and 87, or between the tops of the partitions 73 and the top guide 83 becomes looser as the belt moves and is relatively free, instead of being wedged and squeezed in these narrow spaces when the sides and tops of partitions 73 are parallel to the side guides 86 and 87 and the top guide 83, respectively. This is particularly important when the material is of granular or crystalline nature.

The parts of the feeding mechanism must, of course, be made of materials of construction suitable to withstand the chemical action of the materials being fed. The belt 73 is advantageously molded of soft rubber with the partitions 73 integral therewith. It is advantageous to mold strips of cloth into the belt 73 so as to prevent excessive stretching, any minor stretch of the belt being automatically taken up by the spring 61 pushing the idler pulley 53 away from the drive pulley 47 and thus maintaining the belt under tension.

If replacement of the belt 72 is required, the side plate 101 is taken off, the screw 69 is then removed and the lever 68 lifted until the screw 69 may be screwed through the lever into the tapped hole 70. In this position the fingers 65 push against the surfaces 66, thereby retracting the idler pulley 53 and releasing tension from the belt 72. The screws (not shown) which hold the side guide 87 to the top plate 30 may then be removed whereupon side guide 87 is taken off. This permits removal of the belt and insertion of a new one.

While we have shown and described what we consider the preferred form of our invention, modifications may be made without departing from the spirit of our invention and reference is therefore made to the following claims for a definition of the scope of our invention.

What we claim is:

1. Apparatus for measuring and dispensing fluent materials volumetrically, comprising a hopper having a vertical axis and adapted to contain a quantity of such materials, a drive pulley and an idler pulley rotatably mounted in a horizontal plane below said hopper and on opposite sides of said axis, power means for rotating said drive pulley, an endless solid belt passing over said pulleys and having an upper branch facing said hopper, a stationary support for said upper branch, a plurality of transverse partitions on the outward side of said belt, said partitions being of lesser width than said belt so as to provide on either side of said partitions strips of belt free of partitions, top guides for said partitions, side guides for said partitions adjacent to said strips, said top and side guides forming a passageway conforming to the shape of said partitions and extending along said upper branch, said passageway having an aperture in communication with said hopper, and an additional narrow guide surface adjacent to the lower edge of each of said side guides, each of said additional guide surfaces facing one of said strips and having a width equal to a fraction of the width of said strips.

2. The apparatus of claim 1, the one of said top guides toward which said upper branch of said belt is moving in a direction from said aperture providing a clearance to the tops of said partitions which increases in a direction away from said aperture.

3. The apparatus of claim 1, said partitions having leading top edges and decreasing in height in a direction away from said leading top edges.

4. The apparatus of claim 1, said partitions having leading side edges and decreasing in width in a direction away from said leading side edges.

ERIC PICK.
GUSTAV R. CARLSSON.

REFERENCES CITED

The following references are of record in the file of this patent:

UNITED STATES PATENTS

| Number | Name | Date |
| --- | --- | --- |
| 1,422,002 | Shaw | July 4, 1922 |
| 1,547,276 | Wentz | July 28, 1925 |
| 1,674,634 | Brueggemann | June 26, 1928 |
| 1,906,664 | Thorne | May 2, 1933 |
| 2,020,435 | Schaub et al. | Nov. 12, 1935 |
| 2,034,876 | Morgan | Mar. 24, 1936 |
| 2,141,044 | Rassmann | Dec. 20, 1938 |
| 2,204,097 | Montgomery | June 11, 1940 |
| 2,286,143 | Lee | June 9, 1942 |
| 2,307,008 | Bostick | June 5, 1943 |
| 2,400,667 | Toews | May 21, 1946 |